US006989528B2

(12) United States Patent
Schultz et al.

(10) Patent No.: US 6,989,528 B2

(45) Date of Patent: Jan. 24, 2006

(54) GOLD IMPLANTATION/DEPOSITION OF BIOLOGICAL SAMPLES FOR LASER DESORPTION THREE DIMENSIONAL DEPTH PROFILING OF TISSUES

(75) Inventors: J. Albert Schultz, Houston, TX (US); Michael V. Ugarov, Houston, TX (US); Thomas F. Egan, Houston, TX (US); Agnes Tempez, Houston, TX (US); Yvon Le Beyec, Orsay (FR); Serge Della-Negra, Orsay (FR)

(73) Assignee: Ionwerks, Inc., Houston, TX (US)

( * ) Notice: Subject to any disclaimer, the term of this patent is extended or adjusted under 35 U.S.C. 154(b) by 11 days.

(21) Appl. No.: 10/861,962

(22) Filed: Jun. 4, 2004

(65) Prior Publication Data

US 2005/0035284 A1 Feb. 17, 2005

Related U.S. Application Data

(60) Provisional application No. 60/476,309, filed on Jun. 6, 2003.

(51) Int. Cl.
*B01D 59/44* (2006.01)
*H01J 49/00* (2006.01)

(52) U.S. Cl. ...................... 250/281; 250/282; 250/287; 250/288

(58) Field of Classification Search ................ 250/281, 250/282, 287, 288
See application file for complete search history.

(56) References Cited

U.S. PATENT DOCUMENTS

| | | | | |
|---|---|---|---|---|
| 4,988,879 A * | 1/1991 | Zare et al. | .................. | 250/288 |
| 5,742,049 A * | 4/1998 | Holle et al. | ................. | 250/282 |
| 6,639,213 B2 | 10/2003 | Gillig et al. | | |
| 6,657,191 B2 * | 12/2003 | Park | ........................... | 250/288 |
| 6,683,299 B2 | 1/2004 | Fuhrer et al. | | |
| 2001/0032929 A1 | 10/2001 | Fuhrer et al. | | |
| 2003/0025074 A1 * | 2/2003 | Li | ............................. | 250/288 |
| 2004/0094705 A1 * | 5/2004 | Wood et al. | ................ | 250/288 |
| 2004/0144916 A1 * | 7/2004 | Krutchinsky et al. | ....... | 250/281 |
| 2004/0227072 A1 * | 11/2004 | Park | ........................... | 250/281 |

OTHER PUBLICATIONS

L. Michalak, K. Fisher, D. Alderdice, G. Willet; OMS Letters—C60 Assisted Laser Desorption-Ionization Mass Spectrometry; Rapid Commun. Org. Mass Spectrom. 29, 512 (1994).

F. Hopweed, L. Michalak, D. Alderdice, K. Fisher, G. Willet; C60-Assisted Laser Desorption/Ionization Mass Spectrometry in the Analysis of Phosphotungstic Acid; Mass Spectrom. 8, 881 (1994).

J. Huang, L. Wang, L. Chiang, J. Shiea; Polyfunctional Fullerene Dervatives as UV-MALDI Matrices to Detect peptides and Proteins; J. Fullerene Sci. Technol. 7, 541 (1999).

(Continued)

*Primary Examiner*—John R. Lee
*Assistant Examiner*—Paul M. Gurzo
(74) *Attorney, Agent, or Firm*—Fulbright & Jaworski LLP

(57) ABSTRACT

The present invention enhances the laser desorption of biological molecular ions from surfaces by creating a surface localized MALDI particle matrix by ion implantation of low energy ionized clusters (gold, aluminum, etc.) or chemically derivatized clusters into the near surface region of the sample. MALDI analysis of the intact biomolecules on the surface or within a narrow subsurface region defined by the implantation range of the ions can then be performed by laser desorption into a mass spectrometer or, in a preferred embodiment, into a combined ion mobility orthogonal time of flight mass spectrometer.

34 Claims, 13 Drawing Sheets

OTHER PUBLICATIONS

J. Shiea, J. Huang, C. Teng, J. Jeng, L. Wang, L. Chiang; Use of a Water-Solubel Fullerene Derivative as Precipitating Reagent and Matrix-Assisted Laser Desorption/Ionization Matrix to Selectively Detect Charged Species in AAqueous Solutions; Anal. Chem. 75, 3587 (2003).

S. Ballenweg, R. Gleiter, W. Kraetschmer; TOF MS) as a quick and facile method for the characterization of fullerene derivatives; Synthetic Metals, 77, 209-212 (1996).

T. Brown, N. Clipston, N. Simjee, H. Luftmann, H. Hungerbuhler, T. Drewello; Matrix-assisted laser desorption/ionization of amphiphilic fullerene derivatives; Inter. J. Mass Spectrom. 210/211, 249-263 (2001).

R. Beck, P. Weis, A. Hirsch, I. Lamparth; Laser Desorption Mass Spectrometry of Fullerene Derivatives: Laser-Induced Fragmentation and Coalescence Reactions; Phys. Chem. 98, 9683-9687 (1994).

Tecklenburg, R.E., Jr.; Russell, D.H.; An evaluationof the analytical utility of the photodissociation of fast ion beams; Mass Spectrom.Rev., 9, 405-451 (1990).

Amina S. Woods, Michael Ugarov, Tom Egan, John Koomen, Kent J. Gillig, Katrin Fuhrer, Marc Gonin, and J. Albert Schultz; Lipid/Peptide/Nucleotide Separation with MALDI-Ion Mobility-TOF MS; Anal. Chem., 76, 2187 (2004).

Michael V. Ugarov, T. Egan, Dmitry V. Khabashasku, J. Albert Schultz, Haiqing Peng, Valery N. Khabashesku, Hiroshi Furutani, Kimberley S. Prather, H-W. J. Wang, S. N. Jackson, and Amina S. Woods, MALDI matrices for biomolecular analysis based on functionalized carbon nanomaterials, Anal. Chem.; 2004, 76 (22) 6734-6742.

Tanaka, K., Waki H., Ido Y, Akita S., Yoshida Y., Yoshida T., ; Protein and Polymer Analyses up to m/z 100 000 by Laser Ionization Time-of-flight Mass Spectrometry; Rapid Commun. Mass Spectrom. 88, 2, (151).

Karas M., Bachman D., Hillenkamp F.; Matrix-Assisted Ultraviolet Laser Desorption of Non-Volatile Compounds; Int J. Mass Spectrrom. Ion Processes 1987, 78, (53).

Schurenberg M., Dreisewerd K., And Hillenkamp F., "Laser Desorption/Ionization Mass Spectrometry of Peptides and Proteins with Particle Suspension Matrixes," Anal. Chem. 1999, 71 (221-229).

K.J. Gillig, B. Rutolo, E.G. Stone, D.H. Russell, K. Fuhrer, M. Gonin, J.A. Schultz, "Coupling High Pressure MALDI with Ion MobilityOrthagonal Time-of Flight Mass Spectromerry," Anal. Chem. pp. 72, 3965, (2000).

A.S. Woods, J. Koomen, B. Ruotolo, K.J. Gillig, D.H. Russell, K. Fuhrer, M. Gonin. T. Egan and J.A. Schultz,; A Study of Peptide-peptide Interactions Using MALDI Ion Mobility o-TOF and ESI-TOF Mass Spectrometry, J. Amer. Soc. Mass Spectr. 2002, 13 (166-169).

Pierre Chaurand and Richard M. Caprioli; Direct profiling and imaging of peptides and proteins from mammalian cells and tissue sections by mass spectrometry; Electrophoresis 2002, 23, 3125-3155.

A. Brunelle, S. Della-Negra, J. Depauw, D. Jacquet, Y. Lebeyec, M. Pautrat, K. Baudin, H.H. Andersen; Enhanced secondary-ion emission under gold-cluster bombardment with energies from keV to MeV per atom; Phys. Rev. A 2001, 63, 22902.

Novikov, A., Croff, M.; Della-Negra, S.; Le Beyec, Y.; Pautrat, M.; Schultz, J.A.; Ugarov, M.; Egan, T.; Tempez, A.; Wang, H-Y, J.; Jackson, S.N.; Woods, Matrix-Implanted Laser Desorption/Ionization Mass Spectrometry , A.S. Anal Chem. 2004, 76, 7288-7293.

Tempez, A.; Ugarov, M.; Egan, T.; Schultz, J.A.; Novikov, A.; Della-Negra, S.; Le Beyec, Y.; Pautrat, M.; Caroff, M.; Smetkowski, V.S.; Wang, H-Y. J.; Jackson, S.N.; Woods, A.S., Matrix-Implanted Laser Desorption Ionization (MILDI) combined with ion mobility-mass spectrometry for bio-surface analysis; accepted in J. of Proteom. Res. (page est: 5.3).

A. Tempez, J.A. Schultz, S. Della-Negra, J. Depauw, D. Jacquet, A. Novikov, Y. Lebeyec, M. Pautrat, M. Caroff, M. Ugarov, H. Bensaoula, M. Gonin, K. Furher, and Amina Woods; Orthogonal time-of-flight secondary inon mass spectrometric analysis of peptides using alrge gold clusters as primary ions; Rapid Commun. Mass Spectrom., 2004, 18, 371-376.

B. Ruotolo, K. Gillig, A. Woods, T. Egan, M. Ugarov, J.A. Schultz, D. Russell; Analysis of Phosphorylated Peptides by Ion Mobility-Mass Spectrometry; Anal Chem., 76, 6727-6733.

S. Jackson, Hjwang, A. Woods, M. Ugarov, T. Egan, Jaschultz.; Direct Tissue Analysis of Phospholipids in Rat Brain Using MALDI-TOFMS and MARLDI-Ion Mobility-TOFMS; J Am Soc Mass Spectrom 2005, 16, 133-138.

* cited by examiner

GOLD IMPLANTATION/DEPOSITION OF BIOLOGICAL SAMPLES FOR LASER DESORPTION THREE DIMENSIONAL DEPTH PROFILING OF TISSUES

CROSS-REFERENCE TO RELATED APPLICATIONS

This application claims priority to U.S. provisional application Ser. No. 60/476,309, filed Jun. 6, 2003.

TECHNICAL FIELD

The present invention relates generally to analytical methods instrumentation for the characterization and analysis of molecules originating from biological tissue or other solid samples, based at least on their structures and mass-to-charge ratios as gas-phase ions using an improved MALDI ionization. More specifically, to such instrumentation which provides for rapid and sensitive analysis of composition, sequence, and/or structural information relating to organic molecules, including biomolecules, and inorganic molecules.

BACKGROUND OF THE INVENTION

Matrix Assisted Laser Desorption and Ionization (MALDI) Mass spectrometry of biomolecular ions was first demonstrated in parallel efforts by Tanaka using small metal particles suspended in glycerol and by Karas and Hillenkamp using organic matrices. In both cases the matrix performs the dual function of both adsorbing the laser light and ionizing the non-light absorbing biomolecule through specific yet poorly understood chemical reactions and physical desorption processes.

The MALDI technique is also applied for tissue imaging as the ability of mapping the distribution of targeted compounds in tissue is crucial in the field of human health (disease diagnostics, drug response). Caprioli has pioneered proteomics of intact tissue samples using a new imaging MALDI instrument. Only protein and peptide molecular ions above 5 kDa are imaged to 20 $\mu$m spatial resolution across the tissue surface. Pattern analysis of peptides expressed from tumor and non-tumorous tissue reveal strong correlations between numerous marker proteins/peptides and the disease state.

However, this technique has two major limitations. One is the difficulty to identify molecular ions below 5 kDa and to measure the concentration of low molecular weight drugs because of mass spectral congestion from isobaric lipids, oligosaccarides, nucleotides, and matrix ions. The second limitation is the discrimination of the detection to water-soluble molecules since the technique is based on the solvent-extraction which occurs during the addition of organic matrix solution to the tissue surface.

Alternatively, subcellular isotopic imaging by dynamic SIMS ion microscopy on freeze-fracture samples has also been developed for tissue analysis but it is limited to elemental and small molecule analysis.

Cluster ion beams are emerging as a powerful tool for the modifications of (surface cleaning/smoothing, very shallow implantation) and for SIMS analysis of surfaces. At typical cluster kinetic energies of a few tens of keV, each atom carries a very low energy minimizing damage. In contrast with monoatomic ion beams, higher density energy is deposited in the surface region with cluster ion beams yielding shallower implantation and minimizing channeling. In the analytical field, in recent years, the capabilities of SIMS have been greatly enhanced by the use of small cluster ions as projectiles.

The prior art lacks a method that allows the mass spectrometric identification of the molecular composition of surface or of a narrow subsurface region of organic solids or biomolecular tissues. We introduce a cluster ion bombardment method which when combined with laser ablation removes the topmost layer of such a solid in a way that causes very little damage to underlying layers of tissue material in the area of bombardment. In this way, the surface or near subsurface region can be sequentially interrogated by repeated steps of implantation and laser ablation to yield a spatial or volume distribution of molecules and elements within a solid sample which may be a biological tissue. It would also be desirable to further couple such a method to specialized and highly sensitive and selective mass spectrometric platforms in order to increase selectivity and minimize interferences in a complex sample such as tissue. Furthermore, it would be desirable to focus the cluster source to a submicron particle size so that certain regions of the sample (such as organelles) could be selectively implanted and subsequently interrogated with the laser.

BRIEF SUMMARY OF THE INVENTION

The present invention is directed to a system and method for the mass spectrometric analysis generally, and specifically to mass spectrometric profiling of tissue or other biopolymer or polymeric material. The following numbered sentences more readily describe the present invention.

In one aspect of the present invention, there is an analytical instrument for the characterization and analysis of a sample comprising a MALDI sampling device comprising a sample stage, said sample stage capable of accommodating a sample; a component selected from the group consisting of a metal ion cluster beam source, an inorganic cluster ion beam source, a vapor deposition system, a laser ablation system, a desorption source, and any combination thereof, said component being capable of adding a matrix to said sample, said component being fluidly coupled to said MALDI sampling device; a laser coupled to said MALDI sampling device, said laser being capable of desorbing material from said sample; an ion mobility cell having a drift tube, said mobility cell coupled to said MALDI sampling device and capable of receiving sample from said MALDI sampling device; and, a time-of-flight mass spectrometer having a flight tube positioned orthogonally to said drift tube, said flight tube fluidly coupled to said drift tube. In some embodiments, the metal ion cluster beam is a gold ion cluster beam. In some embodiments, the gold cluster ion beam delivers gold clusters in the range Au100–Au300 and having energy within the range of a few hundred eV/gold atom, to an energy of several hundreds of keV/gold atom. In some embodiments, the gold cluster beam has a spatial resolution of less than one micron. In some embodiments, the MALDI sampling device is an atmospheric MALDI device wherein the MALDI ions are desorbed at atmospheric pressure and transported through a differential pumping interface into the mass spectrometer. In some embodiments, the instrument further comprises a differentially pumped interface between the MALDI sampling device at atmospheric pressure and the mass spectrometer, said differentially pumped interface is an ion mobility cell operating at a pressure of from about 1–10 Torr up to atmospheric pressure. In some embodiments, the drift tube has a carrier gas comprising nitrogen or helium at 2 Torr pressure. In some embodiments, the instrument further comprises a data acquisition electronics and software system. In some embodiments, the sample stage is an X-Y movable stage. In some embodiments, the sample stage is housed in a low pressure chamber. In some embodiments, the component is a vapor deposition system. In some embodiments having a vapor deposition system, the sample stage is a rotatable sample stage. In some embodiments, the component is a laser ablation deposition system. In some embodiments having a laser ablation system, the sample stage is a rotatable sample stage. In some embodiments, the sample stage is a desorption source coupled to an ion mobility cell. In some embodiments having the sample stage is a desorption source coupled to an ion mobility cell, the deposition source comprises a laser ablation source, an electrospray source or a combination thereof. In some embodiments the sample stage is a desorption source coupled to an ion mobility cell, the instrument further comprises gating electronics for size selecting the mobility ion. In some embodiments the sample stage is a desorption source coupled to an ion mobility cell, the sample stage is cryogenically cooled.

In some embodiments, there is a method for the collection of mass spectrometric data from a sample, comprising the steps of adding matrix to the sample with a component selected from the group consisting of a metal ion cluster beam, an inorganic cluster ion beam, a vapor deposition system, a laser ablation deposition system, a desorption source, and any combination thereof laser desorbing chemical species from said sample separating the desorbed chemical species in a drift tube by ion mobility; and, further separating the chemical species in a time-of-flight mass spectrometer. In some embodiments, the step of adding matrix to the sample comprises adding matrix to the sample with a metal ion cluster beam. In some embodiments, the step of adding matrix to the sample with a metal ion cluster beam comprises microfocusing said metal ion cluster beam onto a spot on said sample. In some embodiments the method further comprises the step of microdissecting said sample. In some embodiments having a metal ion cluster beam, the metal ion cluster beam is a gold ion cluster beam. In some embodiments, the step of laser desorbing comprises laser desorbing in an atmospheric MALDI device. In some embodiments, the step of separating the desorbed chemical species in a drift tube by ion mobility comprises separating in a nitrogen or helium mobility carrier at about 1 Torr pressure. In some embodiments, the method further comprises the step of acquisition of two dimensional mass-volume data. In some embodiments, the method further comprises the step of moving the sample in either or both of the X and Y directions. In some embodiments, the step of adding matrix to the sample comprises adding matrix to the sample with vapor deposition. In some embodiments wherein matrix is added to the sample with vapor deposition, the method further comprises the step of rotating the sample. In some embodiments, the step of adding matrix to the sample comprises adding matrix to the sample with a laser ablation deposition system. In some embodiments wherein matrix is added to the sample with a laser ablation deposition system, the method further comprises the step of rotating the sample. In some embodiments, the step of adding matrix to the sample comprises adding matrix to the sample with a desorption source coupled to a mobility cell. In some embodiments wherein the step of adding matrix to the sample comprises adding matrix to the sample with a desorption source coupled to a mobility cell, the desorption source comprises a laser ablation source, an electrospray ionization source, or a combination thereof.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings.

DETAILED DESCRIPTION OF THE INVENTION

Figure 1:
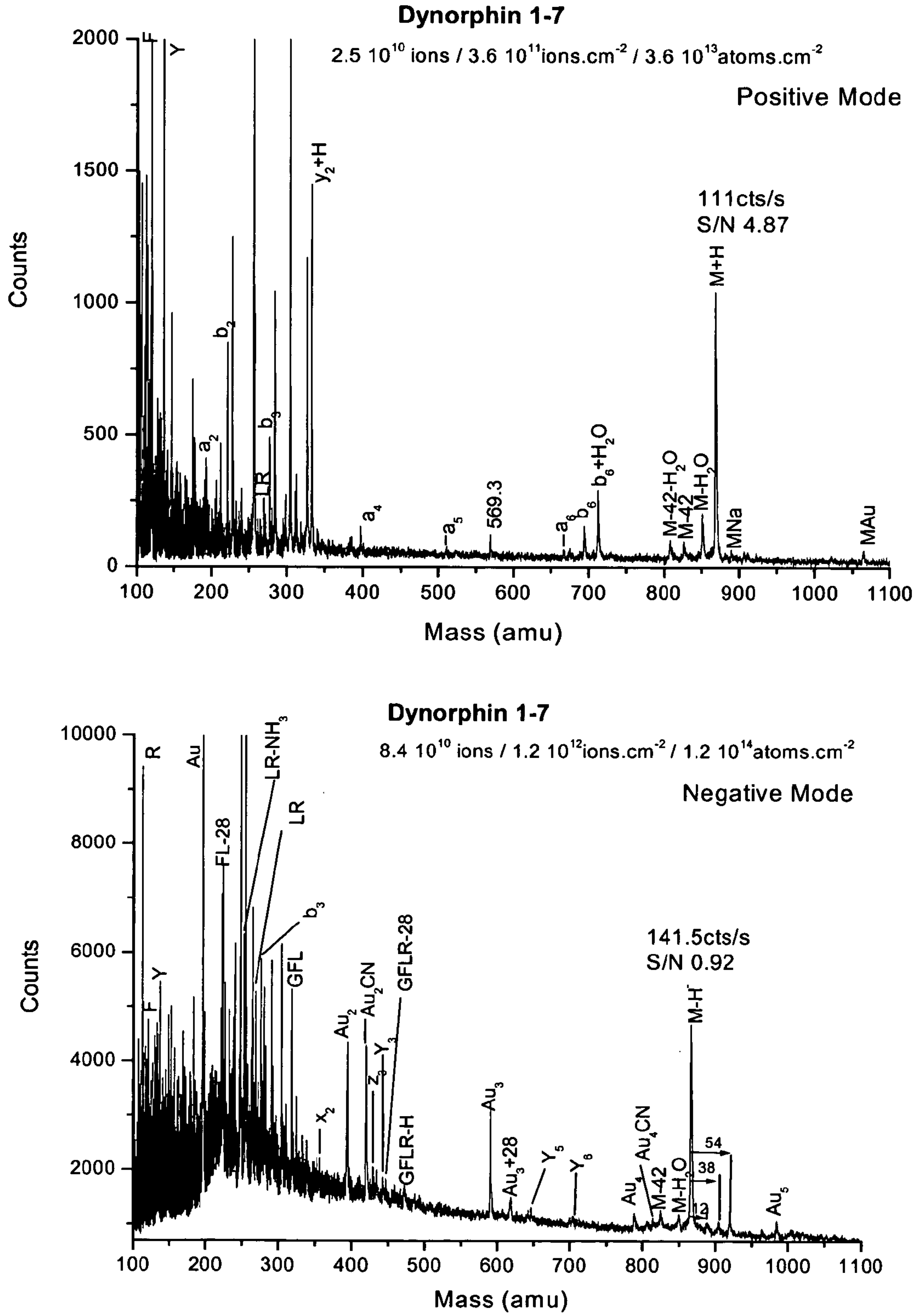
FIG. 1 illustrates positive and negative SIMS spectra obtained from irradiating pure dynorphin 1-7 with 10 keV $Au_{100}^{3+}$ cluster ions.

As used herein, the articles "a", and "an" signify both the singular and the plural and mean one or more than one.

As used herein, IMS is an abbreviation for and is defined as Ion Mobility Spectrometry.

As used herein, MALDI is an abbreviation for and is defined as matrix assisted laser desorption ionization.

As used herein, MS is an abbreviation for and is defined as mass spectrometry.

As used herein, SIMS is an abbreviation for and is defined as secondary ion mass spectrometry.

As used herein, TOF is an abbreviation for "time-of-flight" and is shorthand for a time-of-flight mass spectrometer.

As used herein, oTOF is a time-of-flight mass spectrometer having a flight tube arranged orthogonally to the separation axis of a preceding separation technique.

As used herein MALDI-IM-oTOF is an instrument and method for obtaining mobility resolved mass spectra of MALDI desorbed molecular and elemental ions.

As used herein SIMS-IM-oTOF is an instrument and method for obtaining mobility resolved mass spectra of secondary desorbed molecular and elemental ions which are created during the bombardment of a solid by an energetic primary ion beam which impinges a surface.

The technique described herein allows two and three dimensional depth profiling of large biomolecules, small molecules such as drugs, small inorganic molecules, and elements in biotissues. Matrix is added to a sample by a variety of methods prior to analysis by laser desorption techniques. Since metal clusters can be implanted or vapor deposited to shallow depths, it is possible to use these metal clusters as optical absorption sites for laser desorption. The laser energy is coupled into the implanted metal atoms/precipitates, or implanted compound ions which serve the function of a MALDI matrix. Protons transfer to the biomolecules from the native hydroxyls which form on the metal surface during implantation/deposition or by addition of other functionalities such as carboxylic acids or amines.

Pure bio-organic molecules were analyzed with SIMS using selected clusters of gold atoms ($Au_n^+$) of different sizes at energies of 10–20 keV as primary ions. It was observed that the large gold cluster ion bombardment does not significantly damage small biomolecules for clusters of 100 atoms and higher. Higher energies, of several hundred keV/gold atom causes moderate surface damages. The energy can be varies according to the sample and analytical problem at hand.

Clusters of gold with energies from 10 to 20 keV are produced with a liquid metal source. The cluster mass is selected using a Wien filter. The efficiency of $Au^+$, $Au_3^+$, $Au_5^+$, $Au_9^+$ and $Au_{[n\times100]}^{n+}$ (the mean value of n is about 3) ion clusters as primary beams for the secondary ion emission were examined. A compact time of flight mass spectrometer with orthogonal extraction (oTOF) is used to collect the secondary ions from the same sample at a repetition rate of 20 kHz. The beams are continuous. The oTOF is superior to conventional coaxial reflectron SIMS instruments in this application because it has a resolution of $M/\Delta M=2500$ for 133 a.m.u. and the resolution is not limited by the pulse width of the primary cluster beam. Samples were prepared from solutions in water without addition of matrix. Droplets with diameter of about 2–3 mm were deposited on a stainless plate and simply dried in air.

FIG. 1 shows an example of positive and negative SIMS spectra obtained from irradiating pure dynorphin 1-7 with 10 keV $Au_{300}^{3+}$ cluster ions. Negative and positive mode spectra show the parent ion and characteristic a, b, c, x, y, z fragments. Similar responses were obtained from various biomolecules with masses below 5000; i.e., small peptides (gramicidin S, bradykinin, minigastrin, PKGYLRKDDY, KGYLRKDDDY, R-R gastrin fragment 22-30, and pure gastrin I fragment 1-14) and lipids.

Figure 2:
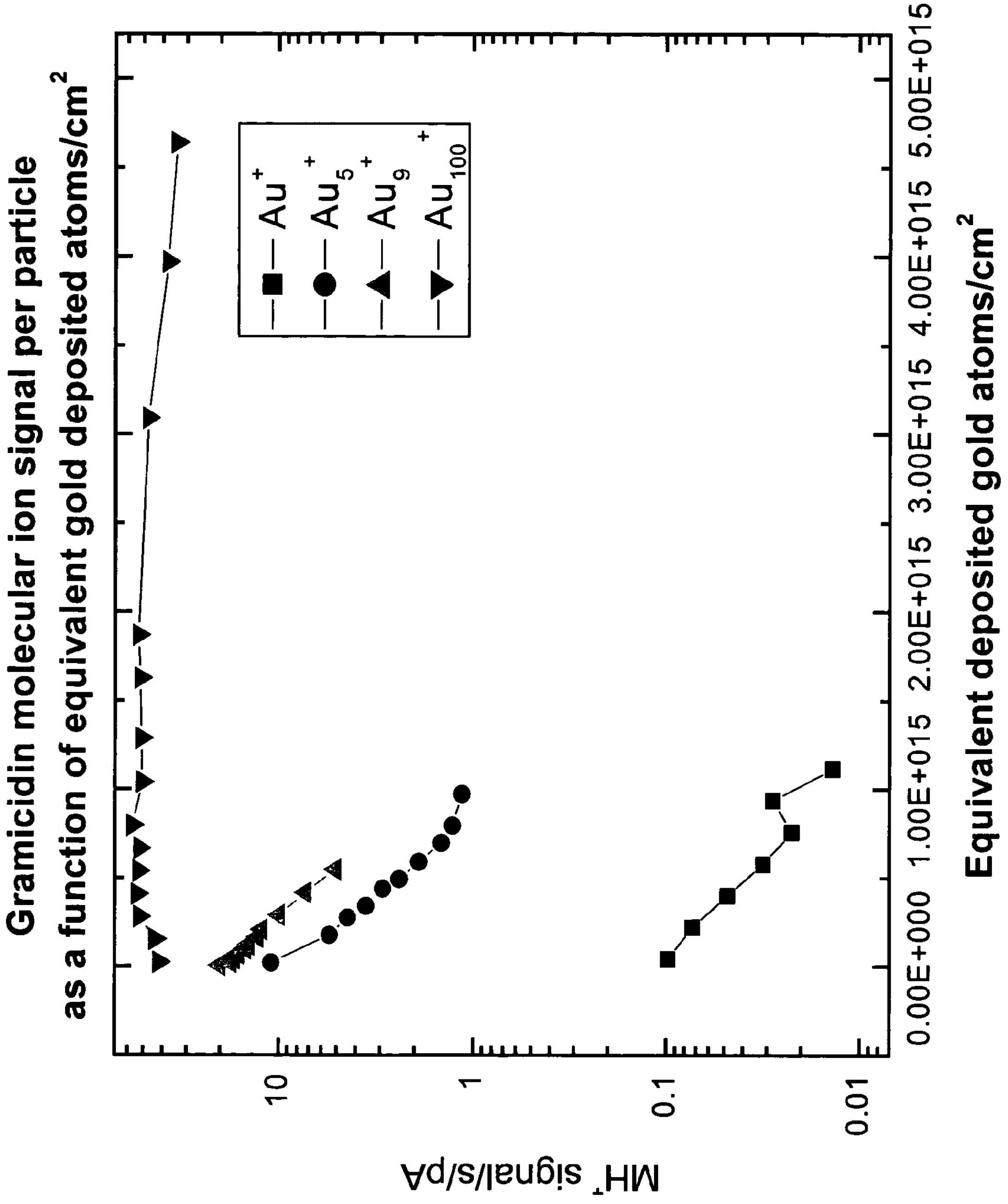
FIG. 2 is a comparison of molecular ion signal from gramicidin S for different 10 keV primary beams: $Au^+$, $Au_5^+$, $Au_9^+$ and $Au_{300}^{3+}$ as a function of equivalent deposited gold atoms/$cm^2$.
Figure 3:
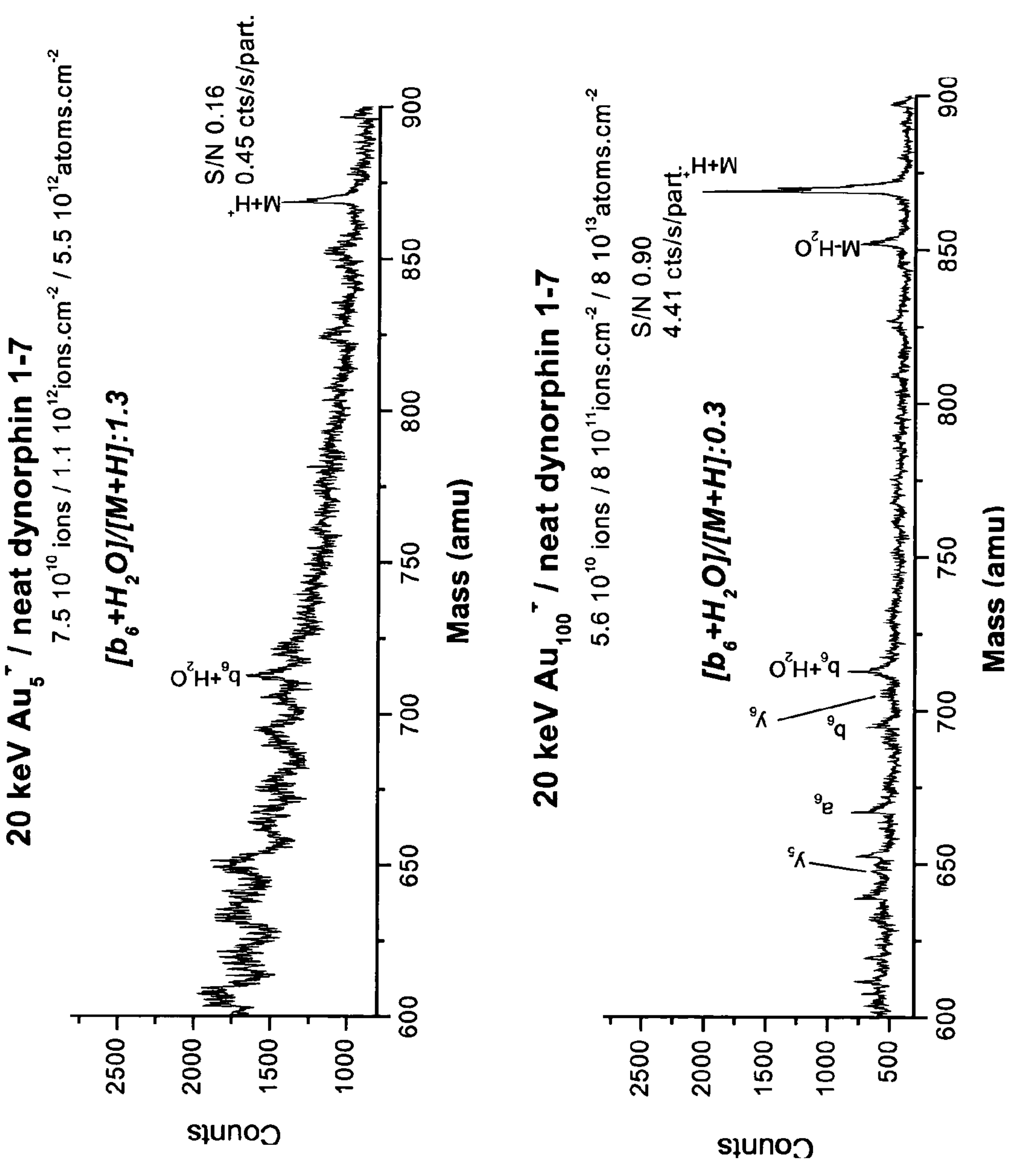
FIG. 3: Positive SIMS spectra from pure dynorphin 1-7 using two different primary beams at 20 keV: $Au_5^+$ ($7.5\times10^{10}$ ions) and $Au_{300}^{3+}$ ($5.6\times10^{10}$ ions).

FIG. 2 shows that the intact ion yield of gramicidin S increases with increasing the size of the clusters. This graph shows the yield enhancement as the size of the primary ion (although the energy per atoms decreases) increases from monoatomic $Au^+$ to $Au_{100}^{3+}$. After almost 4 hours of irradiation under the 10 keV $Au_{100}^{3+}$ cluster ion beam, the molecular ion signal is not significantly decreased. The molecular ion yield increases with the energy of the primary cluster ion (from 10 to 20 keV). As shown in FIG. 3, the signal-to-noise ratio is also improved with larger clusters. The molecular ion signal is enhanced under $Au_{300}^{3+}$ bombardment and the signal-to-noise is significantly improved. Furthermore, as shown by the $b_6$ $+H_2O/MH^+$ intensity ratio, fragmentation is reduced under larger cluster bombardment. FIG. 3 also indicates the lower fragmentation occurring under the largest cluster ion beam bombardment. For dynorphin 1-7, the intensity ratio between the $b_6$ $+H_2O$ fragment to the molecular ion is reduced by a factor 5 from $Au_5^+$ to $Au_{300}^{3+}$ cluster irradiation.

The following table shows the molecular ion signal from the peptide PKGYLRKDDY bombarded successively by $Au_5^+$ ($6.3\times10^{10}$ ions), $Au_{300}^{3+}$ ($7\times10^{10}$ ions), and $Au^{5+}$ ($1.3\times10^{11}$ ions) cluster ion beams. It shows that the molecular ion signal is slightly enhanced after irradiation under the larger cluster beam $Au_{300}^{3+}$. Thus, a positive "matrix" effect from the shallow cluster implantation.

| Beam Sequence | Dose | Molecular Ion Signal Normalized to Dose |
|---|---|---|
| 1) $Au_5^+$ | $6.3\times10^{10}$ ions | 2.9 |
| 2) $Au_{300}^{3+}$ | $7\times10^{10}$ ions | 54 |
| 3) $Au_5^+$ | $1.3\times10^{11}$ ions | 4.33 |

The present invention demonstrates MALDI-based measurements on gold-implanted samples. The chemically derivatized implanted metal acts both as an optical absorption site and as a proton donor for forming $MH^+$ peptide and protein ions and/or other biomolecular ions. After implantation/deposition, the laser is rastered over the tissue sample (either by moving the sample or by rastering the laser beam in discrete spatial steps) so that mass spectra can be correlated with specific spatial locations on the surface and stored, allowing effective mapping of the tissue. The desorption of the implanted top layer will occur until all the cluster optical absorbers have been ablated and then the ablation will be self limited and stop because of the huge difference in the optical absorption cross section of the chosen cluster particle compared to that of the biological sample. After no more ion signal is detected in the mass spectrometer a new implantation layer is formed by implantation or evaporation onto the surface and the process of acquiring the 2D mass resolved image of the new surface is repeated. Each successive implantation/analysis process reveals molecular information from successively deeper layers in the sample. The analog to this in secondary ion mass spectrometry is spatially resolved sputter profiling in which an ion beam is used to both remove and ionize the material to analyze.

Figure 4:
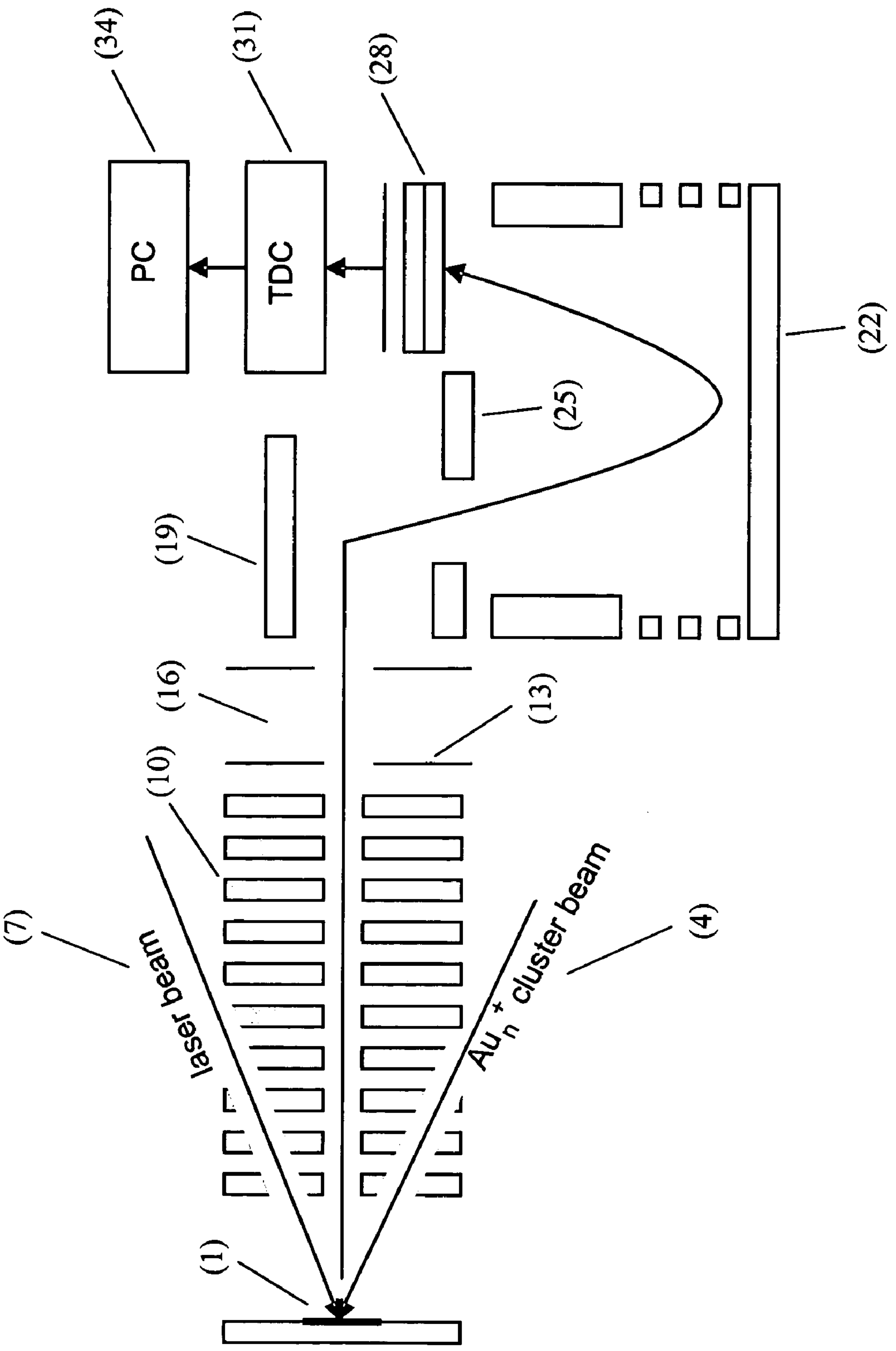
FIG. 4 is a schematic illustrating the gold implantation-assisted laser desorption/ion mobility/orthogonal Time-of-Flight MS instrumental platform.

It is known that 10 keV $Au_{300}^{3+}$ ions can be used as a source to create a shallow metal layer as they only penetrate 1–3 monolayers of biomolecules. Other cluster sizes are possible as well in a range of between 100 and 800 atoms of gold. The metal implantation/deposition assisted laser desorption may be coupled to an orthogonal time of flight mass spectrometry with an ion mobility cell. Ion mobility separates ions according to their drift time determined by their volume to charge ratio. The ion mobility allows for the separation of the co-desorbed Au clusters from the biomolecules but also the separation of elemental, small organic (such as drugs), peptides, proteins and lipids. Ion Mobility Spectrometry has been combined with Matrix Assisted Laser Desorption Ionization for analysis of peptides and other large molecules at femtomole loading (see Gillig et al; "Coupling High Pressure MALDI with Ion Mobility/Orthogonal Time-of-Flight Mass Spectrometry", *Anal. Chem.* 2000, 72, 3965). This instrument allows separation by IMS on the basis of ion volume (shape) while retaining the inherent sensitivity and mass accuracy of orthogonal time of flight MALDI. The present invention demonstrates that the principle of MALDI is possible at high pressure of up to 5 Torr. The present invention demonstrates the collection of mobility spectra with resolution of 50 with a newly designed mobility cell, and that mass spectra are obtainable with extremely low backgrounds of chemical noise with mass resolutions of 2500 for mobility separated test peptides. The instrumental platform for the Metal-Implantation/Deposition-Assisted-Laser-Desorption-Ionization technique coupled with atmospheric MALDI is shown schematically in FIG. 4. A sample (1), preferably a tissue sample, is implanted with gold ions from an $Au_n^+$ cluster beam (4) and is ionized and desorbed by a laser beam (7). The resulting ions traverse a mobility cell (10), pass through slit (13) and a CID cell (16) and enter an orthogonal extractor (19) and into a TOF (22) having a reflector (25). After traversing the flight tube, the ions strike detector (28), resulting in a signal which is processed by a time-to-digital converter (31) and a computer (34).

The ion mobility cell serves several functions. A high pressure interface combines the laser ablation target inside an ion mobility cell. After pulsed laser irradiation, the ablation plume is collisionally cooled within microseconds by interaction with the pure mobility carrier gas (e.g. helium or nitrogen (or air) at 1 Torr). The desorbed ions drift to the end of the mobility cell under the force of a high voltage field. Ion mobility separates ions according to their drift time determined by their charge to volume ratio. The second stage of the MS—MS system is the time-of-flight mass spectrometer with orthogonal extraction which provides continuous sampling of the ions transported through the mobility cell with the resolution of up to 2500. The mobility drift times are typically several milliseconds while the flight times within the mass spectrometer are typically twenty microseconds or less. Therefore, several hundred mass spectra can be obtained after each laser pulse and stored individually. These spectra can be summed over several hundred laser shots so that the ion mass as a function of mobility can be measured. A unique data acquisition electronics and software then allows collection of MALDI-IM-oTOF mobility resolved mass spectra.

Figure 5:
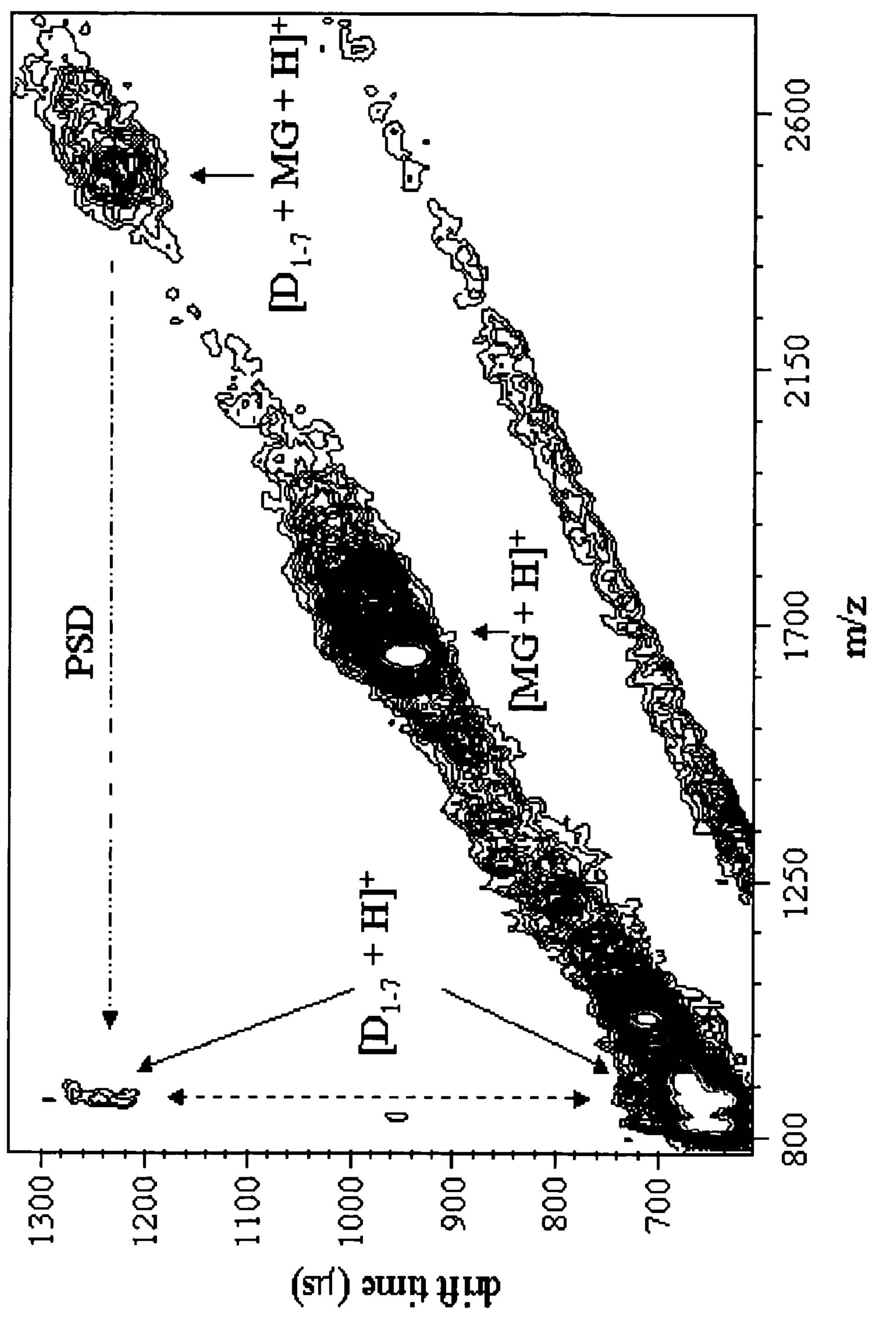
FIG. 5 is a mobility mass contour plot of ion signals observed from a complex of dynorphin 1-7 and Mini Gastrin I desorbed from ATT matrix.

An example of such a plot is shown in FIG. 5 for a mixture of dynorphin 1-7 and mini gastrin I with ATT matrix. Post-mobility cell fragmentation is indicated by the dashed line, and the fragment ion signal observed is correlated to the dynorphin 1-7 signal observed at an earlier arrival time. Also present is the clear separation of peptide monomers and complexes from $C_{60}$ dimer fragments. The separate bottom trend line comes from the high mass derivatives of $C_{60}$ clusters that were added to the mixture for calibration purposes. The fullerenes possess a very different homology and gas phase conformation than peptide ions, and are, therefore, easily discernable from the peptide related signals. One can easily observe the signal from dynorphin/mini gastrin non-covalent complex ion, which lies along the same mobility/mass-to-charge ratio trend line as the parent peptides. Ion mobility coupled to TOF also allows for the direct observation of peptide complex dissociation that occurs after the drift tube and before orthogonal extraction for TOF analysis. The non-covalent complex between mini gastrin I and dynorphin 1-7 undergoes fragmentation after mobility separation has taken place, resulting in a signal corresponding to dynorphin 1-7 at the same mobility drift time as the much larger non-covalent complex. This fragmentation pathway represents a low energy channel of dissociation for such a complex. In addition, the observation of charge retention by dynorphin 1-7 is consistent with the highly basic primary structure of the peptide.

Figure 6:
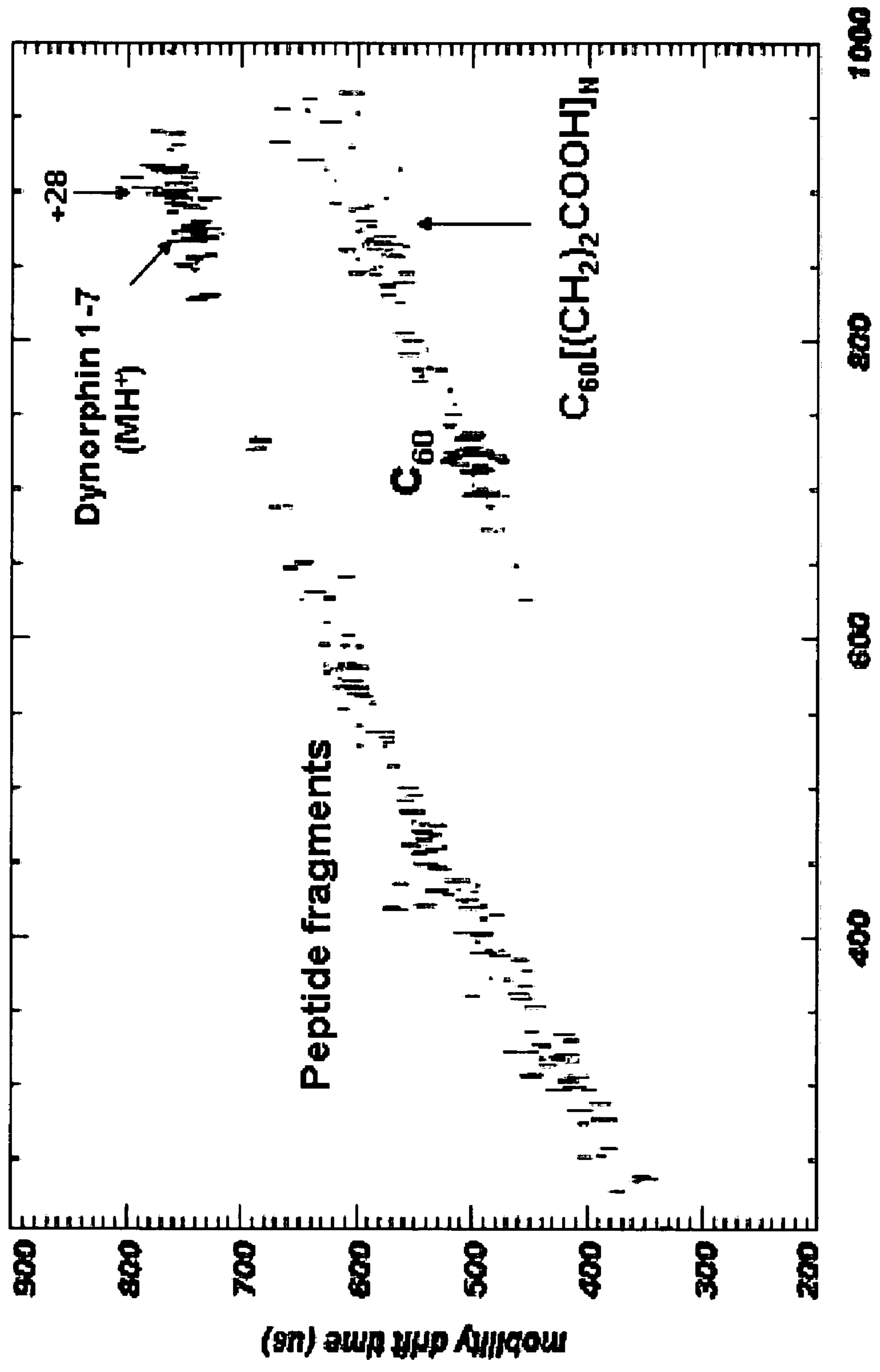
FIG. 6 is a mobility mass contour plot of ion signals from a mixture of dynorphin peptide analyte and a matrix consisting entirely of $C_{60}$ derivatized with an unknown number of attached $CH_2CH_2COOH$ functional side chains.

FIG. 6 shows another example of mobility-mass contour plot from MALDI-IM-oTOF analysis of mixture of dynorphin peptide analyte and a matrix consisting entirely of $C_{60}$ derivatized with an unknown number of attached $CH_2CH_2COOH$ functional side chains. Derivatized $C_{60}$ fullerenes are good alternatives to the widely used organic matrices as they (1) have a wider absorption band, (2) do not interfere with analyte and fragments in the low mass range, (3) possess labile proton for transfer to biomolecules, and (4) are efficient at much lower concentrations. The derivatized fullerene is soluble in ethanol; therefore, an ethanol/water mixture of matrix and peptide was prepared and was deposited using the dried droplet approach onto a stainless steel substrate. The ions for the $C_{60}$ and its higher mass derivatives are well separated by mobility from the dynorphin peptide parent ion and its fragments. In addition to the dynorphin parent ion there are minor ions also present at higher mass which are as yet unidentified. These may be fragments of the side chain derivatives of the $C_{60}$ which have attached to the peptide.

Figure 7:
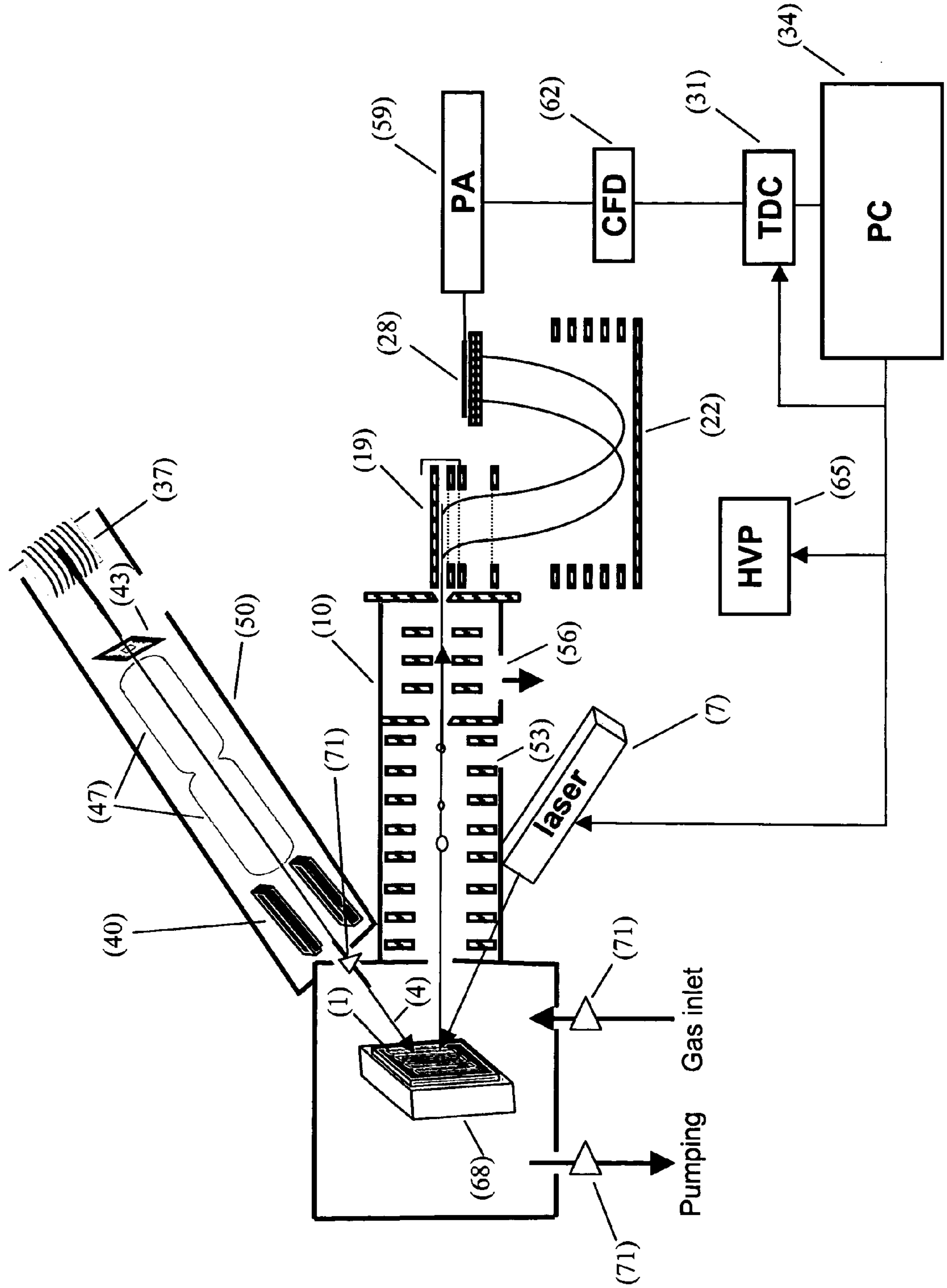
FIG. 7 is a schematic illustrating the metal ion implantation-assisted laser desorption/ion mobility/orthogonal time-of-flight MS instrumental platform for two and three dimensional solid and biological tissue profiling system.

A schematic illustrating the instrumental platform of the three dimensional tissue profiling system is shown in FIG. 7. The tissue sample (1) is maintained under low vacuum (mtorr range) during implanted with a dose of gold ions supplied by a beam of large gold clusters (4) ($Au_{300}^{3+}$). The large clusters are produced from a liquid metal ion source (37) and selected with a Wien filter (40) after passing an aperture (43) and lenses (47) in a differentially pumped high vacuum ion beam column (50). The dose is controlled so that the equivalent of a few monolayers of gold atoms are deposited. The gold cluster implantation energy can be chosen within a range of from about 100 eV up to about 1000 keV. When the gold clusters energy is only about 100–1000 eV, only minimal surface damage is done while at higher energies moderate surface damage is introduced along with a high sputter yield of molecular and elemental secondary ions. The choice of beam energy can be used to control both the surface damage and the depth of cluster implantation. The beam is also focused by means of ion optics (Einzel lenses, deflectors and collimators, not shown)

and can even achieve beam diameters which allow spatial resolutions of less than one micron diameter. The implantation step is performed by moving the sample under this focused ion beam allowing uniform deposition of the gold cluster into the target surface containing the tissue (or other solid sample). The gold beam can even be electronically chopped into time segments as short as 1 microsecond which allows secondary ions which are desorbed during the implantation to be transported by an electric field applied between the sample target assembly and the entrance of the ion into the ion mobility cell (10) even against a counterflow from the 1 Torr pressure of the gas inside the mobility cell. Ions enter the mobility cell (10) after desorption and ionization by laser (7).

Mobility resolution of the secondary ions desorbed during one microsecond long pulse of focused gold cluster ions can then be achieved by acquiring successive oTOF of the mobility resolved secondary ions during each and every 10 microseconds after the cluster ion pulse arrival at the target sample according to methods described in copending patent applications (U.S. patent application Ser. Nos. 09/798,032; 09/798,030; and 10/155,291, all of which are expressly incorporated by reference herein). Alternatively, the apparatus of FIG. 7 can be used as a MALDI apparatus. After gold implantation, the cluster line is vacuum-isolated and the sample chamber is filled with the mobility gas at the mobility cell pressure. Alternatively, the sample chamber is kept under vacuum and ions are transported to the mobility cell through an interface. Intact ions and fragments of the large biomolecules are laser desorbed and enter the ion mobility cell filled with helium. When they exit the cell, the ions have become separated according to their volume to charge ratio. Regions (53) and (56) are of differential pumping, in order to facilitate the decrease in the pressure from the mobility cell to the lower pressures of the mass spectrometer (22). The ions then enter the mass spectrometer (22), penetrate the orthogonal extraction (19) and are reflected before they are detected by the detector (28), preferably an MCP detector previously described in copending U.S. patent applications Ser. Nos. 09/798,032; 09/798,030; and 10/155,291, all of which are expressly incorporated by reference as though fully described herein.

The detector signals may be processed by a preamplifier (59), a constant fraction discriminator (62), a time-to-digital converter (31), and then fed into a PC (34). The PC also controls a high voltage pulser (65) and a timing controller and sample stage controller (not shown). The sample (1) is loaded onto a computer controlled X-Y stage (68). Valves (71) control pressure at various points throughout.

The instrument is extremely versatile. By controlling pressures within the various parts of the instrument and by varying the cluster ion beam energy, the instrument may be used at low pressures as an imaging SIMS-Ion Mobility-oTOF spectrometer, while at higher pressures around the sample the instrument may be used as a MALDI-IM-oTOF in which the MALDI matrix is the implanted gold cluster. Although gold metal ions are shown in this example, it is stressed that other ions may also be used and are within the scope of the present invention. Non-limiting examples include aluminum, indium, gallium, $SF_5$ and fullerenes such as $C_{60}$.

Figure 8:
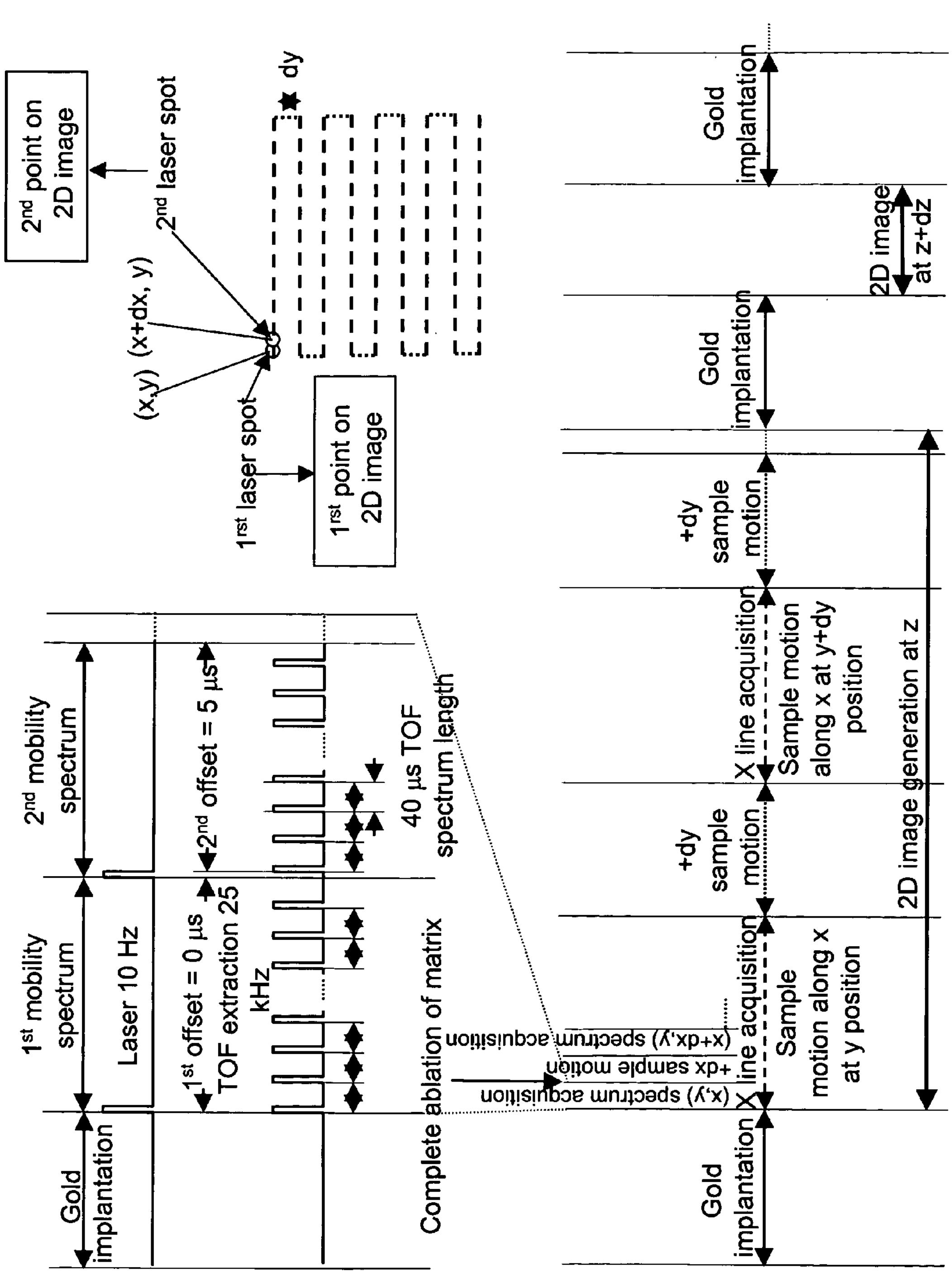
FIG. 8 is a schematic illustrating the acquisition sequence for three dimensional tissue profiling.

FIG. 8 schematically illustrates the acquisition sequence for three dimensional tissue profiling. Initially, in situ matrix deposition is performed over the tissue sample (the specific matrix may be gold implantation, fullerene $C_{60}$ ablation or evaporated deposition, or electrosprayed $C_{60}$ (or its derivatives)). A laser is focused precisely to a 20 $\mu$m or smaller diameter point (located at (x,y)) on the sample to produce a spatially localized MALDI-IM-oTOF mass spectrum. The top diagram illustrates the expanded timing sequence used to acquire a 2-dimensional Ion Mobility Time vs. Mass spectrum. Consecutive oTOF extraction pulses are offset slightly with respect to the laser pulse (all under computer control) to increase the effective mobility resolution that would otherwise be limited by the extraction period of 100 $\mu$s in the figure. Interleaving of the extraction pulse with respect to the laser pulse results in 5 $\mu$s or better mobility time resolution (as described in copending U.S. application Ser. No. 10/155,291, expressly incorporated by reference herein).

Interrogation of the 2-dimensional matrix of mobility time and mass would be under computer control, and could be programmed for marker biomolecules at specified mobility drift time and mass in real-time. Alternatively, with acquisition parameter control, a predefined region of the 2-D matrix is acquired and integrated, drift time and mass windowing, producing a single intensity number associated with the (x,y) sample position.

When the matrix material has been completely ablated at point (x,y), determined either by signal loss or after a known number of laser shots, the sample is moved along the x direction to a point (x+dx,y). The laser spots at (x,y) and (x+dx,y) are preferably overlapping for oversampling and more complete area coverage. During the sample motion, the laser may be turned off. Successive sample motion along x axis/MS acquisition steps are iterated and yield a line image for the mobility drift time-mass region of interest. At the end of the line, the sample is moved along the y direction (dy). This laser rastering generates a 2D image of the top sample layer. For depth profiling this matrix deposition/2D image acquisition sequence is repeated. Then a 3D picture of the tissue sample is available.

Figure 9:
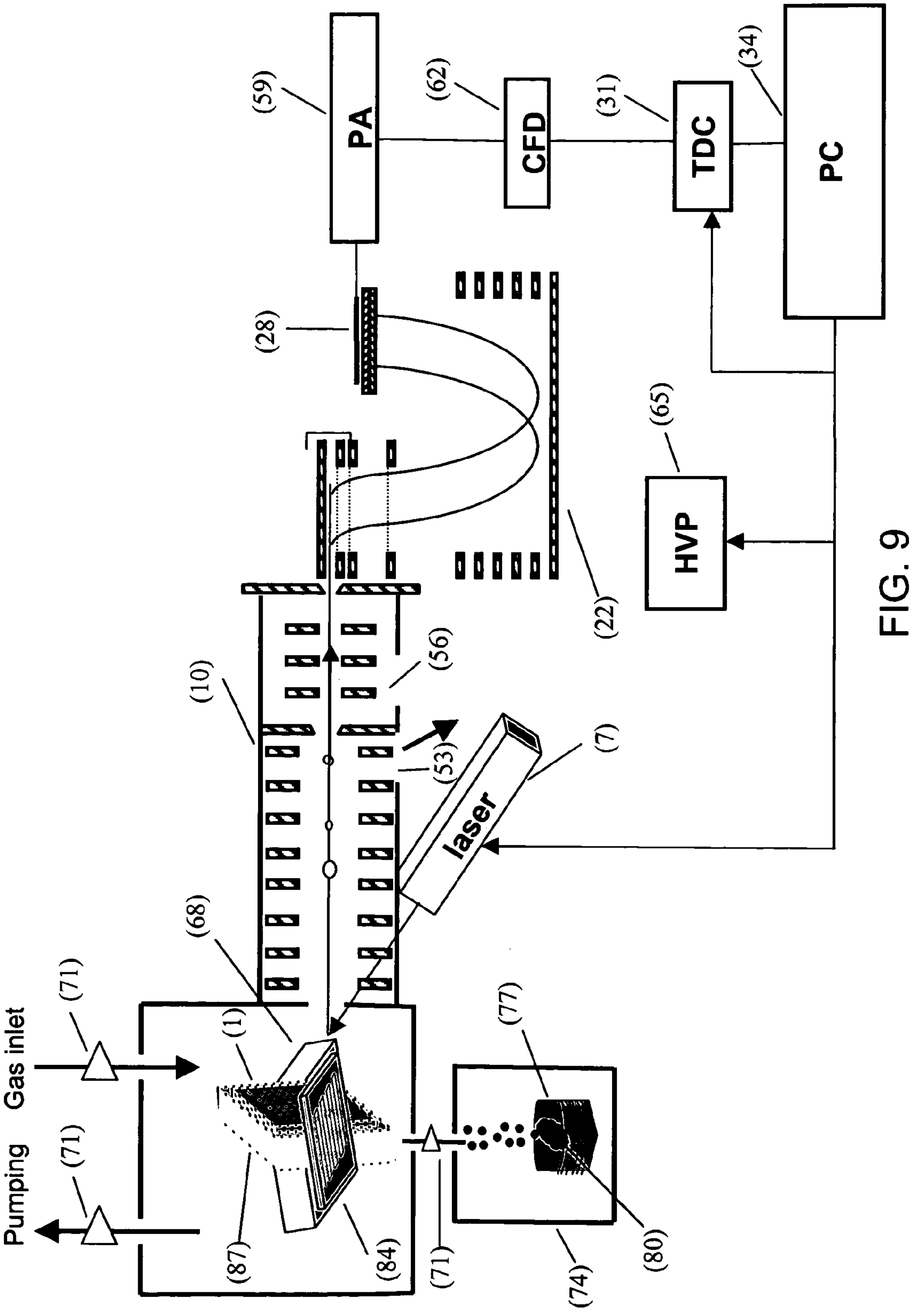
FIG. 9 is an illustration of the apparatus of FIG. 7 having the cluster beam line replaced by a vapor deposition system.

The system may be modified to substitute a vapor deposition system for the cluster beam source. FIG. 9 illustrates this instrument, consisting of the same apparatus as described in FIG. 7, except that the cluster beam line is replaced by a vapor deposition system. Many of the numerical descriptors in FIG. 9 are those defined in FIG. 7. The matrix chamber (74) contains matrix material contained in a crucible (77) is thermally evaporated using heating coils (80) under a low vacuum and deposited onto the tissue sample. In this configuration (84), the sample surface is facing the incident matrix beam (normal to the sample surface). Once the deposition is completed, the deposition chamber is closed with a valve and the sample chamber is filled with the mobility gas at the mobility cell pressure. The sample stage (68) is rotated 90° with respect to the deposition position so that the sample surface is configured normal (87) to the mobility cell axis. Thereafter, one proceeds with laser desorption and MALDI-IM acquisition as shown in FIG. 7 and described in the corresponding text. An alternative would be a system which retains the cluster implantation capability and combines this with the vapor deposition system so that such elements as alkali or other elements can be uniformly deposited onto the sample surface before implantation of the gold cluster. In this way the deposited metal or element can be recoil implanted along with the impinging gold cluster. The purpose of such a procedure would be to increase the ionization yield of molecules either during SIMS or MALDI analysis of the sample.

Figure 10:
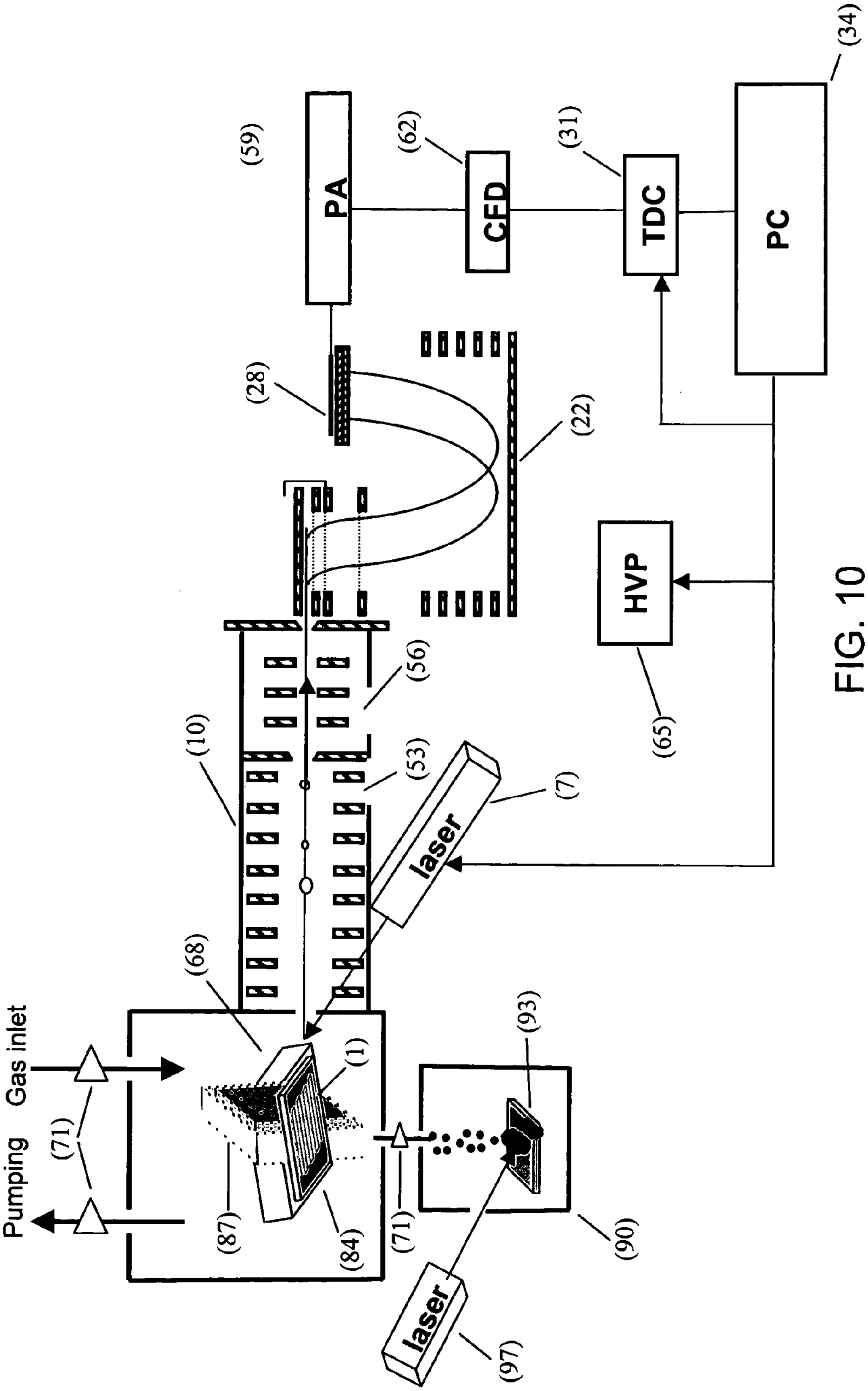
FIG. 10 is an illustration of the apparatus of FIG. 7 having the cluster beam line replaced by a laser ablation deposition system.

The system may be further modified to substitute a laser ablation deposition system for the cluster beam source (or alternatively combining the two capabilities in one system). FIG. 10 illustrates this instrumental embodiment, consisting of the same apparatus as that described in FIG. 7 with the exception that the cluster beam line is replaced a laser ablation deposition system (90). Refer to discussions of earlier instrument figures for definitions of many of the numerical descriptors of FIG. 10. The matrix material contained in a crucible or deposited onto a target (93) is evaporated by laser ablation by laser (97) under a low vacuum and deposited onto the tissue sample (1). In this configuration (84), the sample surface is facing the incident matrix beam (normal to the sample surface). Once the deposition is completed, the deposition chamber is closed with a valve and the sample chamber is filled with the mobility gas at the mobility cell pressure. The sample stage is rotated 90° to a new configuration (87) with respect to the deposition position so that the sample surface is normal to the mobility cell axis. Thereafter, one proceeds with laser desorption and MALDI-IM acquisition as shown in FIG. 7 and described in the corresponding text. This apparatus may also has a timing controller and sample stage controller controlled by the PC.

Figure 11:
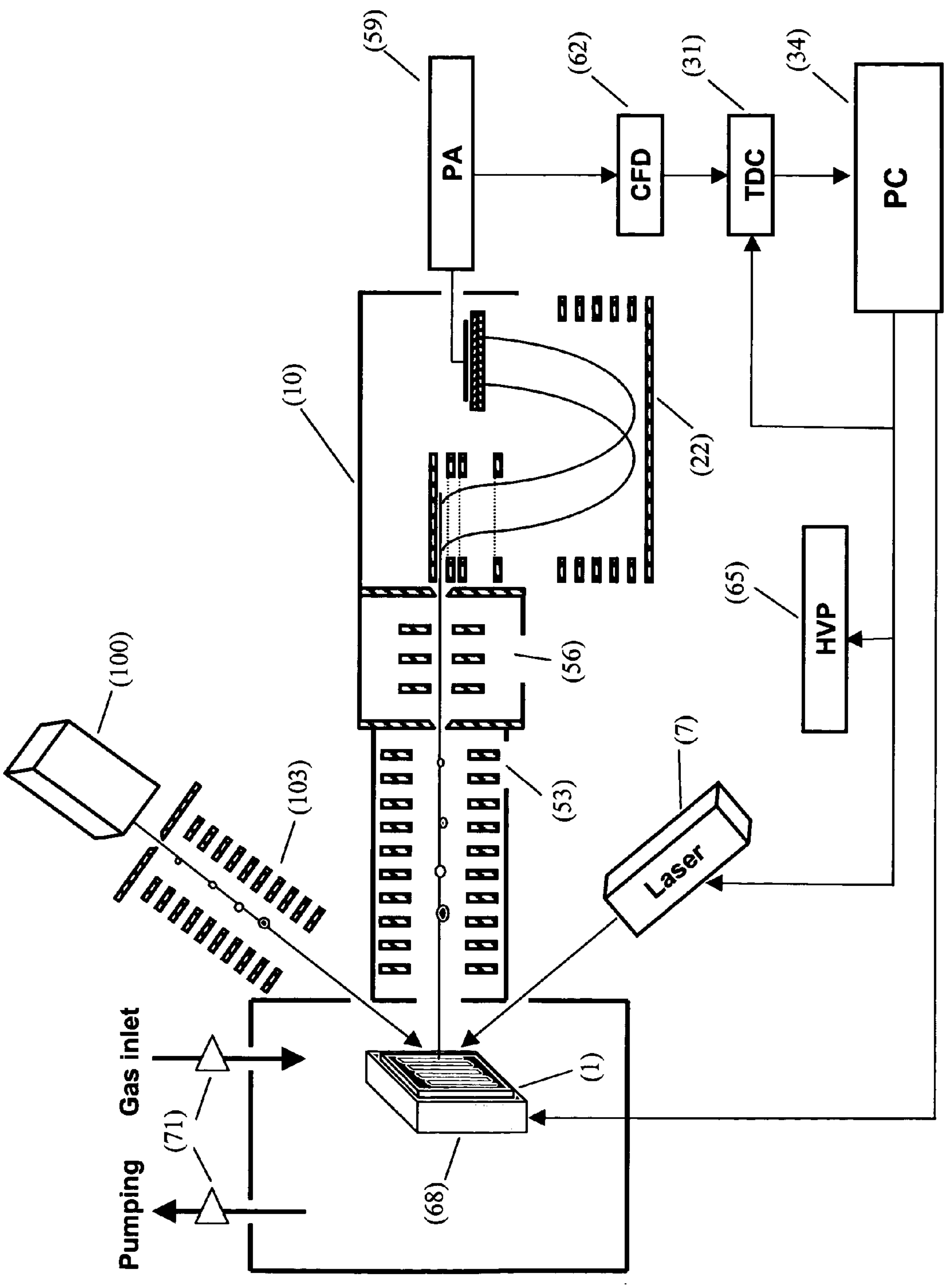
FIG. 11 is an illustration of the apparatus of FIG. 7 having the cluster beam line replaced by a desorption source (laser ablation or electrospray) coupled to a mobility cell.

A further modification may be made to the instrument to substitute a desorption source (laser ablation or electrospray or a combination thereof) for the cluster beam source. FIG. 11 illustrates this instrumental embodiment, which again mirrors the apparatus as described in FIG. 7, with the cluster beam line now replaced by a desorption source (100) which may be a laser ablation source, electrospray source, or aerosol generator/ionizer source (in which aerosol particles are generated by well known methods from solutions or fluidized particulates followed by ionization) each source or which is coupled to a mobility cell (103). Each of these sources can be used to ionize a variety of particulates including but not limited to gold aggregates. Reference is again made to discussions of earlier instrument figures for definitions of many of the numerical descriptors in FIG. 11. The mobility cell allows for selecting the ions or ionized particulates produced by the ionization source. Gating techniques can be used to mobility select only a certain size range of ions which are then deposited onto the sample surface. The energy of the ionized particulate can be manipulated by adjusting gas pressures and voltages between the exit of the mobility cell and the sample. In this way the energy can be tuned to soft land the particulate onto the top of the surface or, by increasing the energy, the particulate can be injected into the near surface layer. Thus upon transport through the mobility cell, they are cooled and soft-land onto the biological tissue sample. This technique would also work for other surfaces besides biological tissues and with other particulate matrices besides gold or other nanoparticulate including but not limited to gold or silver clusters, carbon or fullerene particulates, wide-bandgap nitrides, transition metal clusters, and any of these particulate which have been surface modified.

Once the matrix deposition is completed, one proceeds with laser desorption and MALDI-IM acquisition as described in FIG. 7. In this configuration, the sample chamber and the matrix deposition are maintained at the same pressure (mobility cell pressure) during the whole deposition/MALDI MS acquisition processes. This configuration has the crucial advantage over the others (FIGS. 7, 9, and 10 to preserve the sample in a state very close to its native state because the ion mobility size selected matrix deposition can be done at atmospheric pressure in which the mobility gas and sample region is humidified to prevent water loss from the tissue sample. In examples described in FIGS. 7, 9, and 10, the matrix deposition occurs under low vacuum. This may lead to excessive water desorption, which can potentially alter the sample morphology and composition. In such cases, the sample may then have to be cryogenically cooled.

Figure 12:
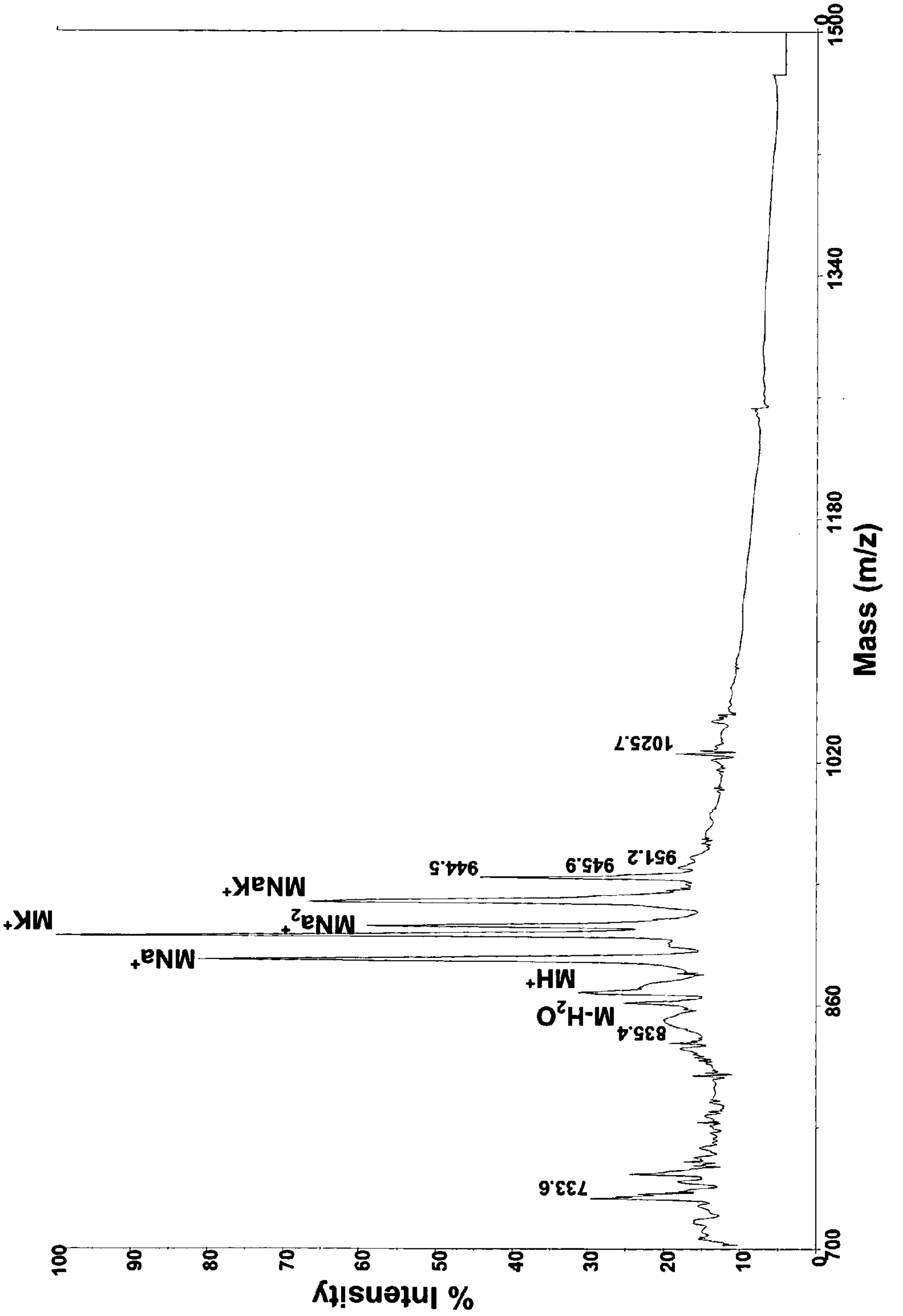
FIG. 12 is a MALDI-TOF spectrum of pure dynorphin 1-7 in water irradiated with 10 keV $Au_{300}^{3+}$ cluster ions for 32 minutes corresponding to a dose of $1.7\times10^{13}$ $Au_{300}^{3+}$ ions/$cm^2$.

In general, metal ion bombardment results in the enhancement of MALDI-based mass spectra of biomolecules such as peptides. FIG. 12 is a MALDI/TOF mass spectrum of a dried droplet of pure dynorphin 1-7 in water deposited on the stainless-steel sample holder. The sample was then irradiated with 10 keV $Au_{300}^{3+}$ cluster ions for 32 min corresponding to a dose of $1.7\times10^{13}$ $Au_{300}^{3+}$ ions/cm$^2$. In contrast to conventional MALDI and cluster SIMS spectra in which the protonated molecular ion peak is dominant, the main peaks on the gold-irradiated spectrum are the alkali-attached parent ions (potassium and sodium). When this spectrum is compared with the spectrum from a control sample which was not Au-irradiated, the signal of the potassiated parent ion peak is more than 50 times lower for the non-irradiated sample. Almost all of the ions in the spectrum of FIG. 12 are the result of sodium or potassium attachment instead of the typical $H^+$ attachment. The cluster bombardment significantly enhances the molecular ion signal. The gold clusters could act as a matrix while the bombardment enhances impurity (alkali) incorporation. When the instrumented platform is augmented with a mobility cell, one can make effective use of the alkali attachment reactions to increase sensitivity and selectivity. Although the data shown in FIG. 12 was collected after gold bombardment, similar results may be obtained using bombardment with other metal clusters. Non-limiting examples include aluminum, indium, gallium, $SF_5$ and fullerenes such as $C_{60}$.

The tissue profiling instrument and method described herein finds use in a number of medical applications. For example, it is useful for the mapping of distribution of targeted compounds in cell and tissues as a function of depth for disease diagnostics such as stroke, cancer, alcoholism, Alzheimer's for studies of therapeutic drug interactions (drug test/screening). Other applications, both those known or obvious to one of skill in the art or those not yet developed are within the scope of present invention.

The applicability of gold cluster implantation to MALDI analysis of tissues can be demonstrated. Direct mass spectrometric analysis of native biological products and/or tissues is one of the exciting prospects in analytical biochemistry. Recent investigations on tissue imaging using MALDI are beginning to yield important molecular information in many areas of biological and medical research. MALDI imaging of peptides and proteins expressed in tumor and healthy tissue may reveal correlations between certain marker proteins/peptides and the disease state. However the uniform incorporation of organic MALDI matrix remains probably the greatest difficulty for a successful MALDI image analysis. Wet matrix treatment of the tissue sample surface suffers from inhomogeneous matrix crystallization. The spatial distribution of the targeted proteins can also be easily perturbed.

Spatially controlled metal cluster beam deposition offers significant advantages as an alternative method for homogeneous, non-destructive and selective matrix incorporation into near-surface regions of bio tissues. The use of the gold liquid metal ion source offers another significant advantage as well. By microfocusing the beam of gold clusters into a spot, preferably a spot of small size (e.g., on the order of one micron diameter), it is then possible to selectively implant gold matrix into desired regions of the sample. Thus information can be obtained from a spatial region on the sample whose size is much less than the diameter of easily formed laser beams. Such an application would be for selectively implanting regions of a tissue sample. Another such application would be for the injection of cluster matrix into the samples removed by laser microdissection microscopes. The dissection microscope works by identifying an area of interest on a biological sample, melting a polymer film onto this selected area with a microfocused laser, peeling off the film which removes the selected area which is attached underneath, inverting the film so that matrix can be added, and obtaining mass spectra from the desired selected area spot. Microfocused cluster ion implantation selectively into such desired microdissected areas of interest would be a much more efficient way of incorporating the matrix material prior to mass analysis or preferably MALDI IM-TOF MS. Although gold was used as a specific example, it should be understood that other cluster ions may be used and that such is within the scope of the present invention.

Figure 13:
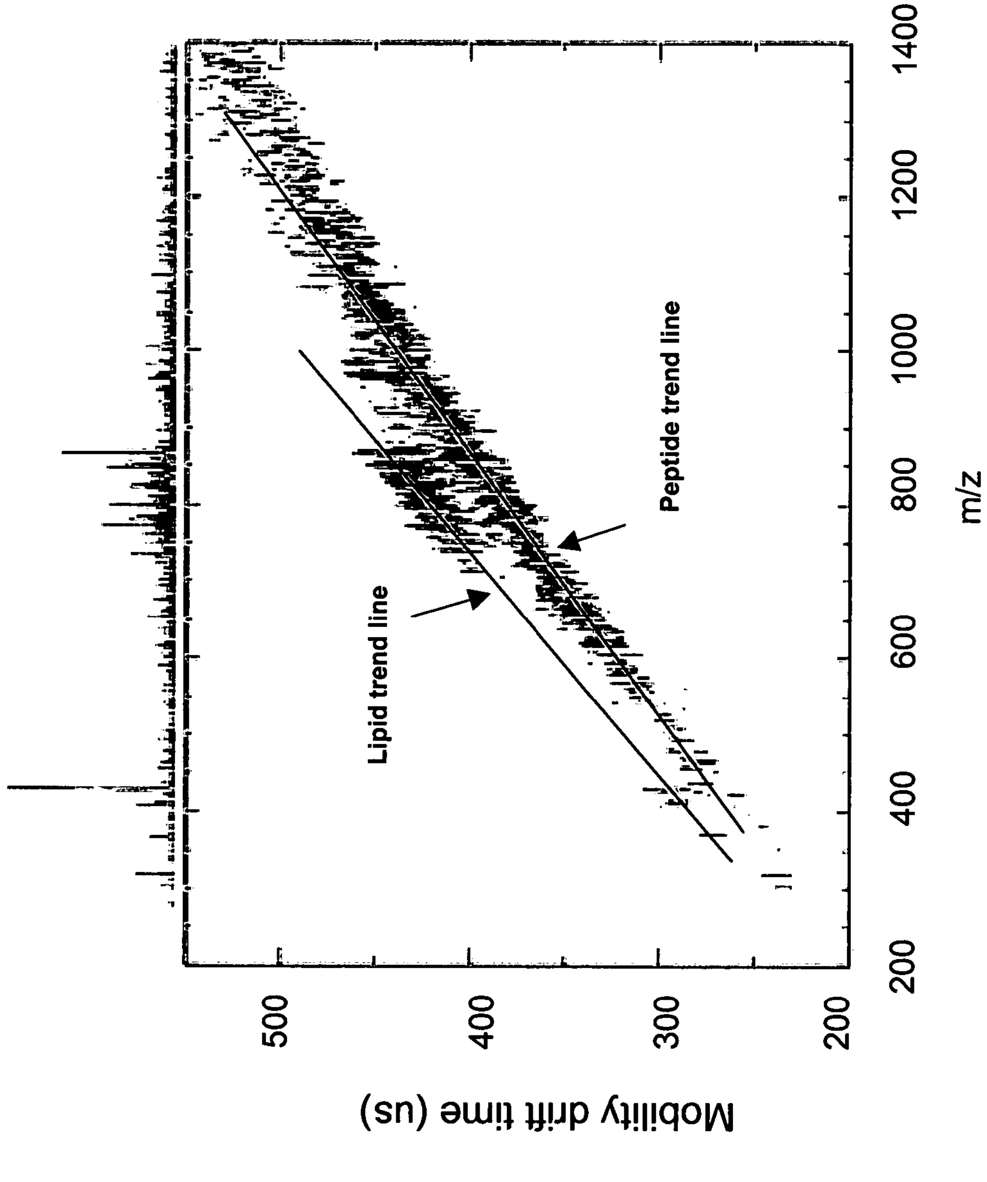
FIG. 13 is a two dimensional plot of ion mobility vs. mass obtained from Srague Dawley rat brain tissue implanted with a fluence of $5\times10^{12}$ $Au_{400}/cm^2$

FIG. 13 shows the 2D MALDI IM-TOF MS spectrum obtained from Sprague Dawley rat brain tissue. Gold clusters of size 400 Au atoms were implanted into the prepared tissue slice. A good separation between the tissue lipids and peptides (corresponding trend lines are shown) is observed. Thus the two major classes of brain tissue molecules which are resolved by mobility in FIG. 13 can be quickly and rigorously assigned to) cationized lipids and peptides based simply on their slope in the ion mobility-m/z chromatogram.

The instrument and method of the present invention has a number of advantages not present in currently-available instruments and methods. For example, it has a wider range of laser wavelengths available for desorption than those of conventional instruments and methods. It affords the ability to use lower laser power levels. It shows no discrimination with respect to specific analyte species owing to different solubilities in the matrix (i.e., in conventional MALDI, decreased solubility in the matrix for a given analyte species results in poorer sensitivity for such an analyte species). It has an easier sample preparation than conventional MALDI methods. It adds depth resolution to the MALDI technique, allowing for profiling of samples. The near-simultaneous collection of mobility separation data and mass spectra results in savings of analysis time. Accordingly, a very high duty cycle can be achieved and sensitivity equal to conventional spectrometers can be maintained if the transmission through the mobility cell can be in the range of 10–50% (which we have shown to be theoretically possible). Easy spectral interpretation is achieved by the pre-separation of peptides, proteins, oligonucleotides, drugs, and lipids in a mobility cell and lower fragmentation from metastable decay since the ions are quickly cooled following low energy collisions. This allows one to minimize spectral clutter. By decoupling the MALDI ionization and the mass analysis into two separate sections of the instrument, high mass resolution can be achieved for the whole mass range and for all fragment ions. Finally, chemical noise, which limits sensitivity in linear or reflector MALDI is minimized or absent and random noise is spread into a 2D space instead of 1D as in conventional MALDI. Thus even a few ion counts within a peak are sufficient for accurate mass measurement. Furthermore, it has been observed that the ionization of the ejected peptides in mixtures is enhanced and more nonspecific at high pressure compared to the low vacuum of conventional spectrometers. The present instrument and method therefore, has an additional significant advantage over commercially available spectrometers for mixture analysis because more peptide ions appear in the mass spectrum compared to high vacuum MALDI. These advantages may be enhanced by using various combinations of the techniques discussed herein, as may be appropriate under the circumstances.

Although the present invention and its advantages have been described in detail, it should be understood that various changes, substitutions and alterations can be made herein without departing from the spirit and scope of the invention as defined by the appended claims. The examples given are merely illustrative and not exhaustive. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the invention is intended to encompass within its scope such processes, machines, manufacture, compositions of matter, means, methods, or steps.

REFERENCES

All patents and publications mentioned in the specifications are indicative of the levels of those skilled in the art to which the invention pertains. All patents and publications are herein incorporated by reference to the same extent as if each individual publication was specifically and individually indicated to be incorporated by reference.

1. U.S. patent application Ser. No. 09/798,032, filed Feb. 28, 2001.
2. U.S. patent application Ser. No. 09/798,030, filed Feb. 28, 2001.
3. U.S. patent application Ser. No. 10/155,291, filed May 24, 2002.
4. Tanaka, K., Waki H., Ido Y., Akita S, Yoshida Y., Yoshida T., Rapid Commun. Mass. Spectrom. 1988, 2, 151.
5. Karas M., Bachman D., Hillenkamp F., Int. J. Mass Spectrom. Ion Processes 1987, 78, 53.
6. Pierre Chaurand and Richard M. Caprioli, Electrophoresis 2002, 23, 3125–3155.
7. Subbash Chandra, "Subcellular isotopic imaging by dynamic SIMS ion microscopy: freeze fracture sample preparation and applications in cell biology and cancer treatment", SIMS Europe 2002, Münster, September 2002.
8. P. Milani and S. Iannotta, "Cluster Beam Synthesis of Nano-Structured Materials," Springer 1999.
9. A. Brunelle, S. Della-Negra, J. Depauw, D. Jacquet, Y. Lebeyec, M. Pautrat, K. Baudin, H. H. Andersen, Phys. Rev. A 2001, 63, 22902.
10. A. Tempez; M. Ugarov, H. Bensaoula, M. Gonin, K. Fuhrer, V. Raznikov, J. A. Schultz, Y. Le Beyec and A. Woods, 50th ASMS conference, Orlando.
11. K. J. Gillig, B. Rutolo, E. G. Stone, D. H. Russell, K. Fuhrer, M. Gonin, J. A. Schultz, "Coupling High Pressure MALDI with Ion Mobility/Orthogonal Time-of-Flight Mass Spectrometry". Anal. Chem. 2000, 72, 3965.
12. A Study of Peptide-peptide Interactions Using MALDI Ion Mobility o-TOF and ESI-TOF Mass Spectrometry, A. S. Woods, J. Koomen, B. Ruotolo, K. J. Gillig, D. H. Russell, K. Fuhrer, M. Gonin, T. Egan and J. A. Schultz, J. Amer. Soc. Mass Spectr. 2002, 13, 166–169.

What is claimed is:

1. An analytical instrument for the characterization and analysis of a sample comprising:

a MALDI sampling device to desorb at least a portion of said sample, said MALDI sampling device comprising a sample stage, said sample stage capable of accommodating a sample;

a component selected from the group consisting of an inorganic cluster ion beam source, a vapor deposition system, a laser ablation deposition system, a desorption deposition source, and any combination thereof, said component being capable of adding a matrix to said sample, said component being fluidly coupled to said MALDI sampling device;

a laser coupled to said MALDI sampling device, said laser being capable of desorbing material from said sample;

an ion mobility cell having a drift tube, said mobility cell coupled to said MALDI sampling device and capable of receiving sample from said MALDI sampling device; and, a time-of-flight mass spectrometer having a flight tube positioned orthogonally to said drift tube, said flight tube fluidly coupled to said drift tube.

2. The instrument of claim 1, wherein the inorganic cluster ion beam source is a metal ion cluster beam source.

3. The instrument of claim 2, wherein the metal ion cluster beam source is a gold ion cluster beam source.

4. The instrument of claim 3, wherein the gold cluster ion beam source delivers a gold ion cluster beam having gold clusters in the range $Au_{100}$–$Au_{300}$ and having energy within the range of a few hundred eV/gold atom, to an energy of several hundreds of keV/gold atom.

5. The instrument of claim 3, wherein the gold cluster beam source has a spatial resolution of less than one micron.

6. The instrument of claim 1, wherein the MALDI sampling device is an atmospheric MALDI device wherein the MALDI ions are desorbed at atmospheric pressure and transported through a differential pumping interface into the mass spectrometer.

7. The instrument of claim 1, further comprising a differentially pumped interface between the MALDI sampling device at atmospheric pressure and the mass spectrometer, said differentially pumped interface is an ion mobility cell operating at a pressure of from about 1–10 Torr up to atmospheric pressure.

8. The instrument of claim 1, wherein the drift tube has a carrier gas comprising nitrogen or helium at 2 Torr pressure.

9. The instrument of claim 1, further comprising a data acquisition electronics and software system.

10. The instrument of claim 1, wherein the sample stage is an X-Y movable stage.

11. The instrument of claim 1, wherein the sample stage is housed in a low pressure chamber.

12. The instrument of claim 1, wherein the component is a vapor deposition system.

13. The instrument of claim 12, a wherein the sample stage is a rotatable sample stage.

14. The instrument of claim 1, wherein the component is a laser ablation deposition system.

15. The instrument of claim 14, wherein the sample stage is a rotatable sample stage.

16. The instrument of claim 1, wherein the sample stage is a desorption source coupled to an ion mobility cell.

17. The instrument of claim 16, wherein the deposition source comprises a laser ablation source, an electrospray source or a combination thereof.

18. The instrument of claim 16, wherein the instrument further comprises gating electronics for size selecting the mobility ion.

19. The instrument of claim 16, wherein the sample stage is cryogenically cooled.

20. A method for the collection of mass spectrometric data from a sample, comprising the steps of:

adding matrix to the sample with a component selected from the group consisting of an inorganic cluster ion beam, a vapor deposition system, a laser ablation deposition system, a desorption deposition source, and any combination thereof;

laser desorbing chemical species from said sample;

separating the desorbed chemical species in a drift tube by ion mobility; and, further separating the chemical species in a time-of-flight mass spectrometer.

21. The method of claim 20, wherein the step of adding matrix to the sample with an inorganic cluster ion beam comprises adding matrix with a metal ion cluster beam.

22. The method of claim 21, wherein said step of adding matrix with a metal ion cluster beam comprises microfocusing said metal ion cluster beam onto a spot on said sample.

23. The method of claim 21, wherein the metal ion cluster beam is a gold ion cluster beam.

24. The method of sentence 21, wherein the step of adding matrix to the sample comprises adding matrix to the sample with a laser ablation deposition system.

25. The method of sentence 24, further comprising the step of rotating the sample.

26. The method of sentence 21, wherein the step of adding matrix to the sample comprises adding matrix to the sample with a desorption source coupled to a mobility cell.

27. The method of sentence 26, wherein the desorption source comprises a laser ablation source, an electrospray ionization source, or a combination thereof.

28. The method of claim 20, further comprising the step of microdissecting said sample.

29. The method of claim 20, wherein the step of laser desorbing comprises laser desorbing in an atmospheric MALDI device.

30. The method of claim 20, wherein the step of separating the desorbed chemical species in a drift tube by ion mobility comprises separating in a nitrogen or helium mobility carrier at about 1 Torr pressure.

31. The method of claim 20, further comprising the step of acquisition of two dimensional mass-volume data.

32. The method of claim 20, further comprising the step of moving the sample in either or both of the X and Y directions.

33. The method of claim 20, wherein the step of adding matrix to the sample comprises adding matrix to the sample with vapor deposition.

34. The method of sentence 33, further comprising the step of rotating the sample.

* * * * *